United States Patent
Prakash (10) Patent No.: US 10,974,497 B2
(45) Date of Patent: Apr. 13, 2021

(54) MULTI-REGION TEMPERATURE CONTROLLED BASE FOR ADDITIVE MANUFACTURING

(71) Applicant: The Boeing Company, Chicago, IL (US)

(72) Inventor: Om Prakash, Bangalore (IN)

(73) Assignee: The Boeing Company, Chicago, IL (US)

(*) Notice: Subject to any disclaimer, the term of this patent is extended or adjusted under 35 U.S.C. 154(b) by 249 days.

(21) Appl. No.: 15/614,476

(22) Filed: Jun. 5, 2017

(65) Prior Publication Data
US 2018/0345649 A1 Dec. 6, 2018

(51) Int. Cl.
| | |
|---|---|
| *B33Y 50/02* | (2015.01) |
| *B33Y 30/00* | (2015.01) |
| *B29C 64/245* | (2017.01) |
| *B29C 64/393* | (2017.01) |
| *B29C 64/295* | (2017.01) |
| *B29C 64/386* | (2017.01) |
| *B33Y 10/00* | (2015.01) |
| *B28B 1/00* | (2006.01) |

(52) U.S. Cl.
CPC .............. *B33Y 50/02* (2014.12); *B28B 1/001* (2013.01); *B29C 64/245* (2017.08); *B29C 64/295* (2017.08); *B29C 64/386* (2017.08); *B29C 64/393* (2017.08); *B33Y 30/00* (2014.12); *B33Y 10/00* (2014.12); *Y02P 10/25* (2015.11)

(58) Field of Classification Search
CPC ....... B33Y 30/00; B33Y 50/02; B29C 64/386; B29C 64/20; B29C 64/106
See application file for complete search history.

(56) References Cited

U.S. PATENT DOCUMENTS

| | | | | |
|---|---|---|---|---|
| 6,822,194 B2* | 11/2004 | Low | ...................... | B22F 3/1055 219/121.83 |
| 8,206,637 B2* | 6/2012 | Dietrich | ................ | B22F 3/1055 264/112 |

(Continued)

FOREIGN PATENT DOCUMENTS

| | | |
|---|---|---|
| CN | 102741028 | 10/2012 |
| CN | 103640218 | 3/2014 |

(Continued)

OTHER PUBLICATIONS

Dai et al., "Preheating Effects on Multiple Material laser Densification," Proceedings of the 13th Annual SFF Symposium, 2002, pp. 392-399, The University of Texas at Austin, Austin, TX/USA.

(Continued)

*Primary Examiner* — Francisco W Tschen
*Assistant Examiner* — Elisa H Vera
(74) *Attorney, Agent, or Firm* — Haynes and Boone, LLP (57) ABSTRACT

Various additive manufacturing systems and methods are described. In one example, a base is configured to receive deposition material from an additive manufacturing apparatus. The base includes a plurality of regions configured to be individually temperature controlled to affect heat transfer characteristics of at least a portion of the received deposition material. A temperature control system is coupled with the regions and configured to adjust an associated temperature of each of the regions.

20 Claims, 10 Drawing Sheets

(56) References Cited

U.S. PATENT DOCUMENTS

| | | | |
|---|---|---|---|
| 8,840,386 B2 | 9/2014 | Anbarasu et al. | |
| 9,096,009 B2 | 8/2015 | Anbarasu et al. | |
| 9,517,592 B2* | 12/2016 | Yoo | B33Y 10/00 |
| 2010/0090374 A1* | 4/2010 | Dietrich | B22F 3/1055 |
| | | | 264/497 |
| 2014/0290183 A1 | 10/2014 | Childs et al. | |
| 2015/0056319 A1 | 2/2015 | Din et al. | |
| 2016/0096326 A1* | 4/2016 | Naware | B33Y 30/00 |
| | | | 425/143 |
| 2017/0190120 A1* | 7/2017 | Bloome | B33Y 30/00 |
| 2017/0266890 A1* | 9/2017 | Volk | B29C 64/171 |
| 2017/0313049 A1* | 11/2017 | Colchester | B33Y 30/00 |

FOREIGN PATENT DOCUMENTS

| | | |
|---|---|---|
| CN | 105666866 | 6/2016 |
| DE | 202013009112 | 2/2014 |
| EP | 3002112 | 4/2016 |
| WO | WO 2015/081600 | 6/2015 |

OTHER PUBLICATIONS

Furumoto et al., "Study on Reduction of Residual Stress Induced during Rapid Tooling Process: Influence of Heating Conditions on Residual Stress," Key Engineering Materials, Sep. 2010, pp. 785-789, Trans Tech Publications Ltd., Zurich/Switzerland.

Kempen et al., "Producing, crack-free, high density M2 HSS parts by selective laser melting: pre-heating the baseplate," Proceedings of the 24$^{th}$ Annual SFF Symposium, 2013, pp. 131-139, The University of Texas at Austin, Austin, TX/USA.

Li et al., "Effects of processing parameters on the temperature field of selective laser melting metal powder," Powder Metallurgy and Metal Ceramics, retrieved at https://rd.springer.com/article/10.1007/s11106-009-9113-z, Jun. 5, 2017, 5 pages.

* cited by examiner

MULTI-REGION TEMPERATURE CONTROLLED BASE FOR ADDITIVE MANUFACTURING

BACKGROUND

Technical Field

The present application generally relates to additive manufacturing and, more specifically, to temperature control techniques for additive manufacturing.

Related Art

Various materials can be used in the field of additive manufacturing (e.g., 3-D printing) to manufacture geometrically simple or complex components. Generally, an additive manufacturing process includes heating a deposition material, for example, polymers or metals, and depositing them on a base (e.g., deposition surface) according to various techniques such that the deposited material solidifies and cures into a geometrical shape. For purposes of this disclosure, the geometrical shape may be referred to as a manufactured component or product. For example, a solid circular pattern may be deposited on the base and the same pattern may be layered one on top of another to form a relatively simple solid cylindrical component. In such simple components, particularly geometries that are symmetrical in shape, heat tends to dissipate substantially uniformly, and the component cools down without significant residual stress or distortion.

The additive manufacturing process may also be used to manufacture more geometrically complex components that are not necessarily symmetrical and that may have varying thicknesses and sizes throughout the component. For example, a mold of a denture or a component for an aircraft engine may have complex structure with varying thicknesses, shapes, and sizes. In such cases, different regions of the components cool down (e.g., solidify and cure) at different rates. For example, thinner areas may dissipate heat more quickly and therefore may also cool down and cure faster, whereas thicker areas may dissipate heat more slowly and therefore may also cool down and cure more slowly. Areas close to the outer edges of the components may dissipate heat more quickly, whereas areas more toward the center of the component may dissipate heat more slowly. When adjacent areas of the same component cool down at different rates, the component may exhibit increased distortion and increased residual stress due to physical effects of the material such as contraction.

SUMMARY

Systems and methods are disclosed herein in accordance with various embodiments that provide improved control of heat flow and thermal gradients in additive manufacturing operations. In particular, the temperature of individual regions of a deposition base plate used in such manufacturing operations may be individually controlled. In doing so, residual stress and distortion may be reduced in the manufactured product. For example, by controlling the heat transfer rates and heat transfer flow/paths associated with the individual regions of the deposition base plate, desired portions of the manufactured components may be cooled down more evenly at substantially the same rate during an additive manufacturing process to reduce such residual stress and distortion.

According an embodiment, a system may include a base configured to receive deposition material from an additive manufacturing apparatus, wherein the base includes a plurality of regions configured to be individually temperature controlled to affect heat transfer characteristics of at least a portion of the received deposition material; and a temperature control system coupled with the regions and configured to adjust an associated temperature of each of the regions to reduce residual stress and distortion in a product that is fabricated from the received deposition material during an additive manufacturing process.

According to another embodiment, a method for additive manufacturing may include: receiving deposition materials on a base comprising a plurality of regions configured to be individually temperature controlled to affect heat transfer characteristics of at least a portion of the received deposition material; and adjusting, by a temperature control system coupled with the regions, an associated temperature of each region based on heat transfer characteristics to reduce residual stress and distortion in a product that is fabricated from the received deposition material during an additive manufacturing process.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Techniques for reducing distortion and residual stress in additively manufactured products are desirable. By controlling heat flow and thermal gradients of a manufactured component, the component may be cooled down more uniformly at substantially the same rate throughout the component during the additive manufacturing process to reduce distortion and residual stress.

Herein the present disclosure, the term "heat transfer characteristics" is defined as parameters that are related to heat transfer properties known to those skilled in the art. Examples of heat transfer characteristics include, for example, heat flow rate and thermal gradients, but are not necessarily limited thereto.

As the deposition material is deposited on an additive manufacturing base, the deposition material solidifies to form at least a portion of the product or component that is being manufactured. For example, a first layer of the component may initially be deposited by an additive manufacturing apparatus on the base of the additive manufacturing system where the first layer of the deposited material solidifies or fuses together. This process is generally repeated with second and subsequent layers until the final layer is deposited and the final complete component is made. The manufacturing process generally includes heating the deposition material, for example, by a laser, and then begins to cool down thereafter. As the deposited material begins to cool down, the described techniques of the present disclosure provide for controlling the cool down rate of the deposited material by controlling the cool down rate at each region of the deposited material. This can be achieved by regionalizing the base and adding heat to selected/desired regions to slow the cool down rate at those regions or removing heat to certain regions to increase the cool down rate at those regions. By selectively controlling regional temperature of the deposited material, heat transfer rate of the deposited material may be controlled and the temperature of the deposited material may be kept substantially uniform across the entire deposited material (e.g., maintained at a temperature range that is within predetermined manufacturing tolerances). Thus, the deposited material can be solidified and cured while maintaining substantially the same temperature across the entire deposited material, and avoid and/or reduce excessive residual stress and distortion.

According to an embodiment of the present disclosure, heat transfer flow and heat transfer rate of a component may be controlled by setting and/or adjusting the temperature of the base of the additive manufacturing apparatus. In some embodiments, the base may be divided into a plurality of regions such that the temperature of each of the plurality of regions may be controlled.

Figure 1:
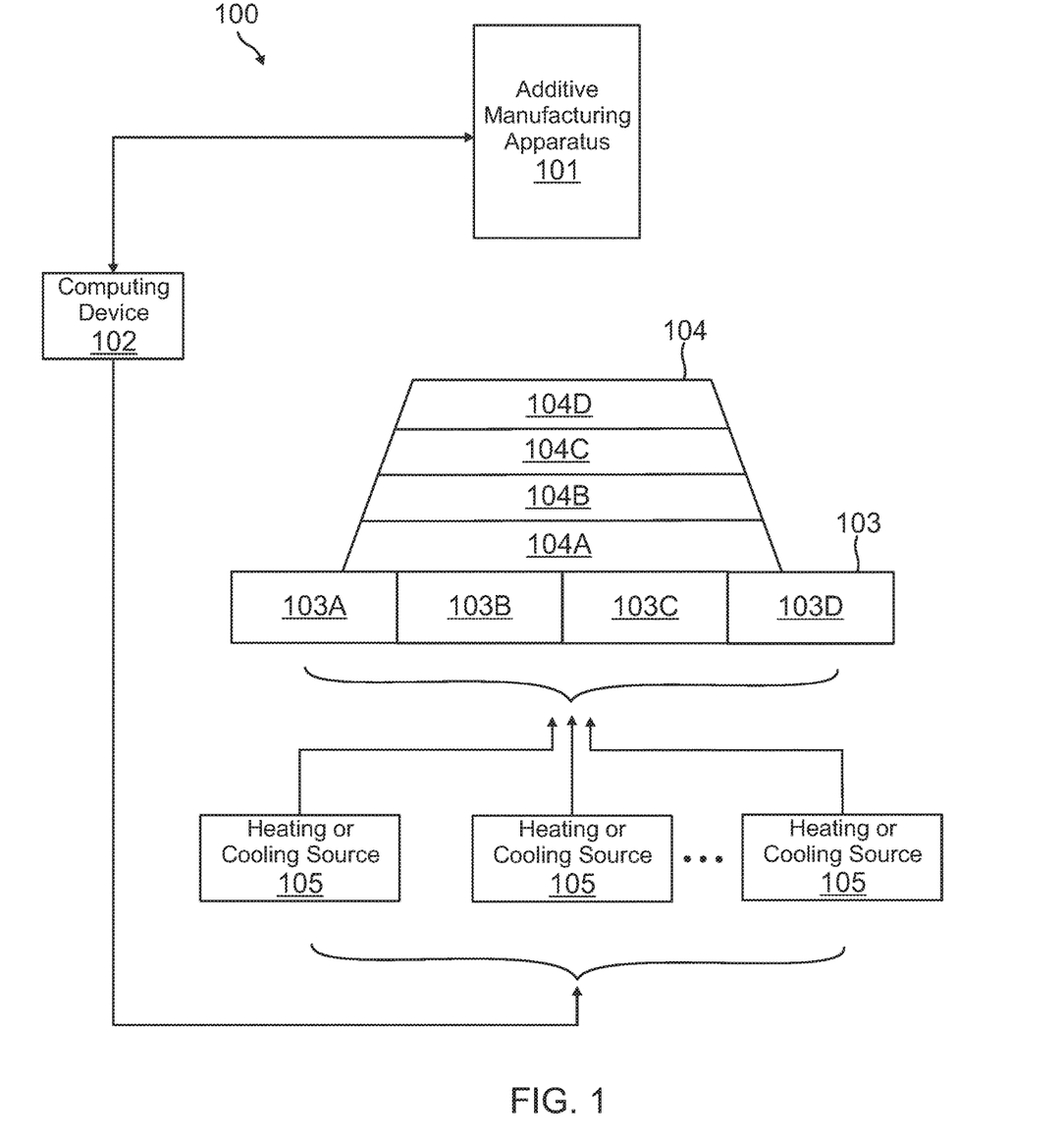
FIG. 1 is an overview block diagram of an additive manufacturing system according to an embodiment of the present disclosure.

FIG. 1 is a block diagram of an additive manufacturing system 100 according to an embodiment of the present disclosure. The additive manufacturing apparatus 101 may include various types of additive manufacturing apparatuses such as, for example, Stereolithography (SLA) apparatus, Digital Light Processing (DLP) apparatus, Fused Deposition Modeling (FDM) apparatus, Selective Laser Sintering (SLS) apparatus, Selective Laser Melting (SLM) apparatus, Electronic Beam Melting (EBM) apparatus, or Laminated Object Manufacturing (LOM) apparatus.

The additive manufacturing system 100 includes a base plate ("base 103") for depositing the deposition material by the additive manufacturing apparatus 101. Herein the present disclosure, the term "deposition material" is intended to refer to the material such as polymer or metal (e.g., metal powder) that is used to manufacture the component with an additive manufacturing system. When the deposition material is deposited on the base, the deposition material may be referred to as "deposited material" or "received deposition material." The term "component," "manufactured component," "product," or "manufactured product" is intended to refer to an object that is made or manufactured by the deposited material through the additive manufacturing process.

According to an embodiment of the present disclosure, the base 103 is divided into a plurality of regions 103A, 103B, 103C, 103D and the temperature of each region 103A-103D may be individually controlled to affect the heat transfer characteristics of at least a portion of the deposited material 104 that is deposited over the corresponding region. For illustrative purposes, the example deposited material 104 shows four layers of deposited material 104A, 104B, 104C, and 104D. Collectively, all of the layers of the deposited material will be referred to as deposited material 104 in the present disclosure. By way of example, the example base 103 illustrated in FIG. 1 is divided into four regions 103A, 103B, 103C, and 103D. Accordingly, the heat transfer characteristics of the portion of the deposited material over region 103A may be affected by adjusting the temperature of region 103A. Similarly, the heat transfer characteristics of the portion of the deposited material over region 103B, 103C, and 103D may be affected by adjusting the temperature of regions 103B, 103C, and 103D, respectively.

In this manner, the temperature of each region that corresponds to a portion of the deposited material over that region may be varied to add heat to the deposited material to allow that portion of the deposited material to cool down more slowly (i.e., to dissipate heat from the additive manufacturing process less quickly) or to remove heat from the deposited material to allow that portion of the deposited material to cool down more quickly, thus affecting the heat transfer characteristics of that portion of the deposited material. By adjusting the temperature of each region, the entire deposited material may be solidified and/or cured more uniformly thus reducing residual stress in the deposited material. In some embodiments, stress annealing of the component may be achieved after the component is fully formed or deposited by heating the base to a desired temperature for a desired amount of time followed by controlled cooling. Thus, herein the present disclosure, the additive manufacturing process is intended to include some or all portions of the additive manufacturing cycle. For example, the additive manufacturing process may include just the deposition phase, or it may include all phases such as the deposition phase, the heating phase, the solidifying phase, the curing phase, the stress annealing phase, and the cool down phase.

In some embodiments, each region includes one or more heat transfer elements (shown in FIG. 3) associated with one or more heating or cooling sources 105. The heat transfer element is configured to transfer heat between the region and the deposition material. For example, according to one example embodiment, the heat transfer element may be an electric resistive or inductive heating element and the heating source 105 may be a power source (e.g., a current source) that is configured to provide an electric current to the electric heating element, which causes the resistive or inductive heating element to become hotter and thus increase the temperature of the associated region. This increase in the temperature of the associated region adds heat to the deposited material that is on the region, which will slow down the rate at which the heat dissipates from the deposited material. Other types of heat transfer elements may be envisaged and will be provided in more detail with reference to FIG. 3.

In some embodiments, the regions 103A-103D are modular regions that are configured to be mechanically coupled together to form a larger composite base. For example, region 103A may be an independent and separate region from the other regions 103B-103D, and a user may selectively choose desired regions and arrange them in a desired manner to form a larger composite base. The modular regions may be mechanically coupled with each other, for example, using coupling devices such as fasteners or containers to hold them together, and the modular regions may be thermally decoupled from each other. In other words, the modular regions may be thermally insulated from each other so that heat does not flow between the modular regions. Accordingly, each individual modular region may be able to provide an individual heat transfer characteristic to the corresponding deposited material as determined by the user. In some embodiments, the modular regions are movable along and X-axis, Y-axis, and/or Z-axis direction as desired by the user. In this manner, the user may adjust the position of the modular regions so precisely align the regions to the desired positions.

In some embodiments, the heat transfer characteristics of each region 103A-103D may be further distinguished from one other by manufacturing each region with material that has different thermal conductivity. For example, region 103A may be made of a first material (e.g., a steel alloy) which has a relatively higher thermal conductivity compared to region 103D, which may be made of a second material (e.g., alumina) and has a relatively lower thermal conductivity. Thus, the user may arrange the modular regions based on the thermal conductivities of the modular regions 103A-103D to control the heat transfer characteristics of the deposited material in selected areas of the overall composite base 103.

Figure 2:
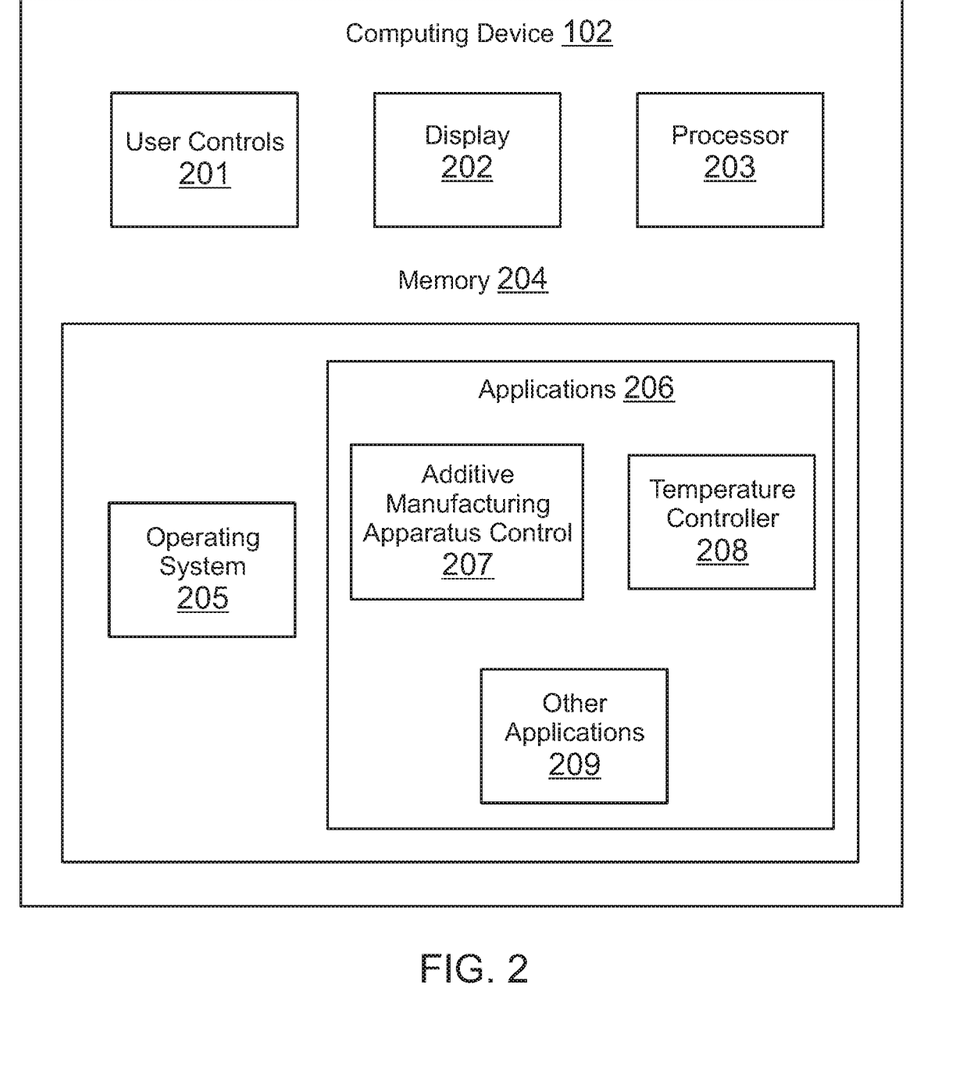
FIG. 2 is a block diagram of a computing device used with the additive manufacturing system, according to an embodiment of the present disclosure.

A computing device 102 may be utilized together with the additive manufacturing apparatus 101 to perform the additive manufacturing operations according to various embodiments of the present disclosure. The computing device 102 which may include, in some embodiments, one or more subsystems and related modules thereof. FIG. 2 is a block diagram of the computing device 102 used with the additive manufacturing apparatus 101 illustrated in FIG. 1, according to an embodiment. Although a variety of components are illustrated in FIG. 2, components may be added and/or omitted for different types of devices as appropriate in various embodiments. According to an embodiment, the computing device 102 includes user controls 201, a display 202, a processor 203 and a memory 204.

The display 202 may be, for example, a flat screen display or a touch screen display. In some embodiments, the user controls 201 may be integrated with and may also be a part of the display 202. For example, a touch screen display may have a user interface including user controls 201 where the operator may adjust various settings and/or parameters by touching the user interface with fingers to control the additive manufacturing system 100. In other embodiments, the user controls 201 may be a separate component from the display 202. For example, the computing device 102 may have separate user controls 201 that may have a plurality of buttons, switches, and dials to adjust the various settings and/or parameters by pushing the buttons, flipping the switches, and/or turning the dials.

The processor 203 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices.

In some embodiments, the processor 203 may execute machine readable instructions (e.g., software, firmware, or other instructions) stored in the memory 204. In this regard, the processor 203 may perform any of the various operations, processes, and techniques described herein. For example, in some embodiments, the various processes and subsystems described herein (e.g., additive manufacturing apparatus control 207 or temperature controller 208) may be effectively implemented by the processor 203 executing appropriate instructions. In other embodiments, the processor 203 may be replaced and/or supplemented with dedicated hardware components to perform any desired combination of the various techniques described herein.

The memory 204 may be implemented as a machine readable medium storing various machine readable instructions and data. For example, in some embodiments, memory 204 may store an operating system 205 and applications 206 as machine readable instructions that may be read and executed by the processor 203 to perform the various techniques described herein. The memory 204 may also store data used by operating system 205 and/or applications 206. In some embodiments, memory 204 may be implemented as non-volatile memory (e.g., flash memory, hard drive, solid state drive, or other non-transitory machine readable mediums), volatile memory, or combinations thereof.

The applications 206 may include applications such as, additive manufacturing apparatus control 207, temperature controller 208, as well as other applications 209 that are not necessarily provided herein. The additive manufacturing apparatus control 207 may be configured to provide commands to the additive manufacturing apparatus 101 in response to receiving commands from a user at the user controls 201 or it may be in response to an automated command generated by the additive manufacturing apparatus control 207 application. Temperature controller 208 may be configured to provide temperature adjustment information for the regions to the heating or cooling source 105. For example, temperature controller 208 may receive ambient temperature information of the additive manufacturing system 100, temperature information at the regions, and/or computed desired temperature information for the regions as determined by the additive manufacturing apparatus control 207, and provide a control signal to the heating or cooling source 105, which in turn heats or cools the heat transfer elements at each of the regions.

Figure 3:
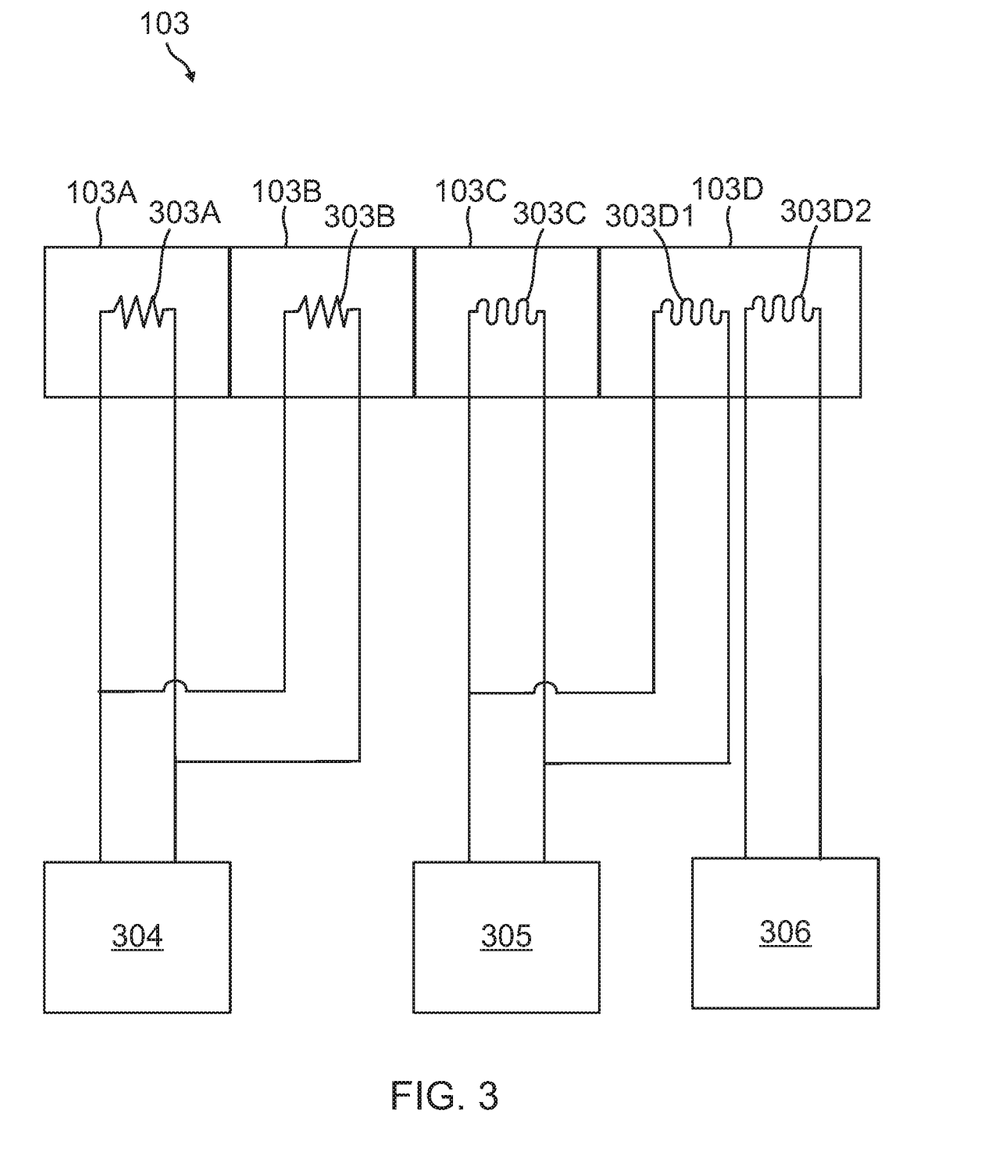
FIG. 3 is a block diagram of a multi-region temperature controlled base according to an embodiment of the present disclosure.

FIG. 3 is a block diagram of a multi-region temperature controlled base 103 according to an embodiment of the present disclosure. According to the embodiment, the base 103 is divided into four regions 103A-103D. Each region includes one or more heat transfer elements 303 for changing the temperature of the corresponding region and each heat transfer element 303 is coupled to a heating source or cooling source 304, 305, 306 that is configured to cause the corresponding heat transfer element to heat up for cool down the corresponding region. In some embodiments, a region (e.g., region 103D) includes more than one (e.g., two) heat transfer elements 303D1 and 303D2. The embodiments in FIG. 3 illustrate various example arrangements but other arrangement may also be envisaged. For example, although not illustrated, one region may include three or four heat transfer elements.

In some embodiments, a heating source or cooling source 304, 305, or 306 is coupled to just one heat transfer element. In other embodiments, the heating source or cooling source 304, 305, or 306 is coupled to a plurality of heat transfer elements 303. That is, each heat transfer element 303 may be coupled to its own dedicated heating or cooling source 304-306 or it may share the heating or cooling source 304-306 with another heat transfer element corresponding to another region. For example, heating source 304 is coupled to both heat transfer elements 303A and 303B, heating source 305 is coupled to both heat transfer element 303C and 303D1, and heating source 306 is coupled to just heat transfer element 303D2.

In the illustrated example embodiment of FIG. 3, the heat transfer element 303A of region 103A is an electric a resistive or inductive heater that is electrically coupled to a heating source 304, which may be a power source that is configured to provide current to the resistive heating element. The resistive or inductive heater becomes hotter when a higher current is applied to it, which heats the region 103A to affect the heat transfer characteristics of the deposited material over the region 103A. When a lower current is provided by the power source, the resistive or inductive heater is less hot and therefore allows the deposition material to cool down at a faster rate.

In some embodiments, the heat transfer elements 303C and 303D1 are liquid heating coils where a heated liquid flows through the coils. In such case, the heating source 305 may include, for example, a heat pump for pumping the heating liquid through the pipes to the coils of the heat transfer elements 303C, 303D1. The coils which are heated by the heated liquid increases the temperature of region 103C and 103D to affect the heat transfer characteristics of the deposited material over regions 103C and 103D, respectively. In some embodiments, the heating source 305 may vary the temperature of the heating liquid to vary the rate of heat transfer between the deposited material and the region.

In some embodiments, the heat transfer element 303D2 is a liquid cooling coil where a cooled or chilled liquid flows through the coils. In such case, the cooling source 306 may include, for example, a condenser for pumping the cooling liquid through the coils of the heat transfer element 303D2. In this case, since the heat transfer element 303D2 is a liquid cooling coil, heat from the deposited material on the region 103D is transferred to the cooled liquid in the coil and the liquid carrying the heat from the deposited material is transferred back to the condenser in the cooling source 306 where it is cooled again by removing the heat from the liquid.

As illustrated in FIG. 3, region 103D includes both a heat transfer element 303D1 for heating the region 103D and a heat transfer element 303D2 for cooling the region 103D. Thus, the region 103D may be used to add heat using the heat transfer element 303C or the region 103D may be used to remove heat using heat transfer element 303D2 as determined by the user.

In some embodiments, the heat transfer elements 303 may be embedded inside of a respective region 103A-103D. For example, region 103A may have a hollow center and the resistive heat transfer element 303A may be attached to the interior of region 103A. Yet in other embodiments, the heat transfer elements 303 may be coupled to an external portion of the regions 103A.

Figure 4A:
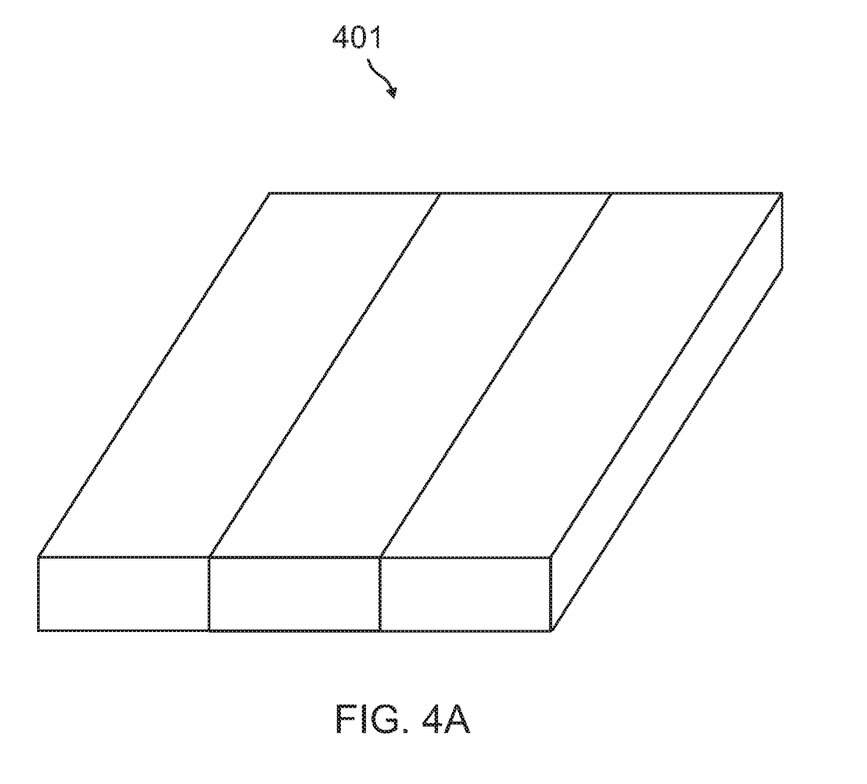
FIGS. 4A-4E are perspective views of various configurations of the multi-region base according to embodiments of the present disclosure.
Figure 4B:
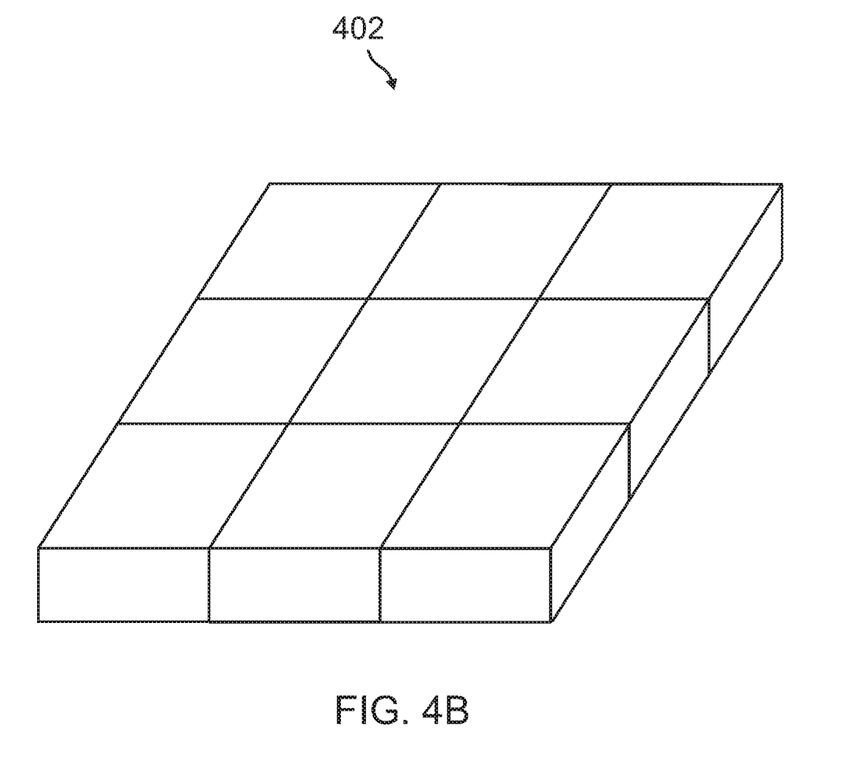
Figure 4C:
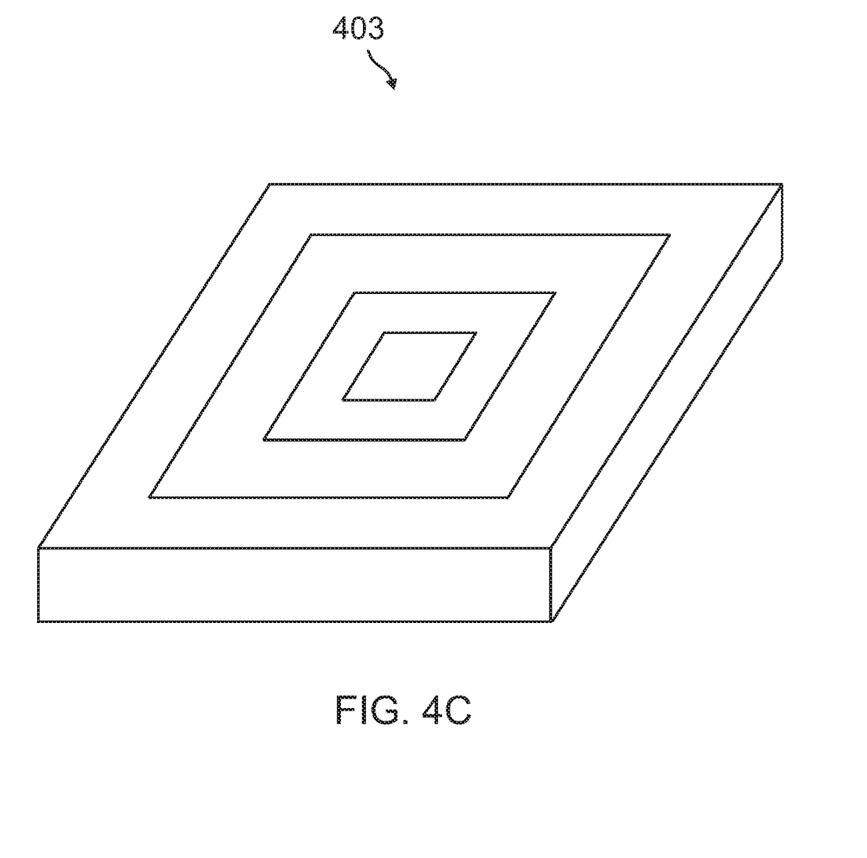
Figure 4D:
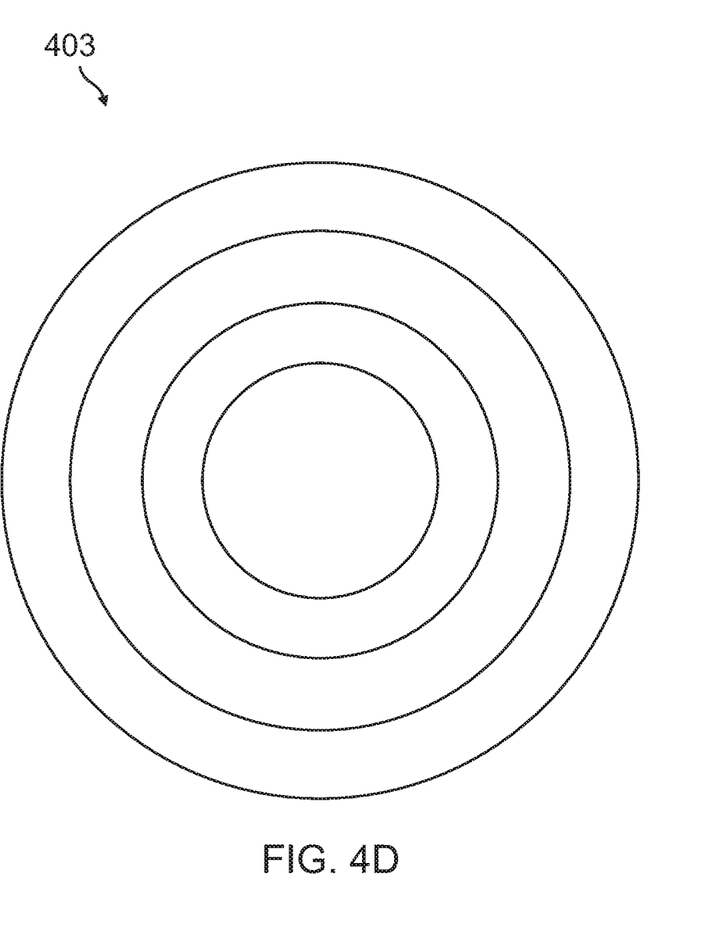
Figure 4E:
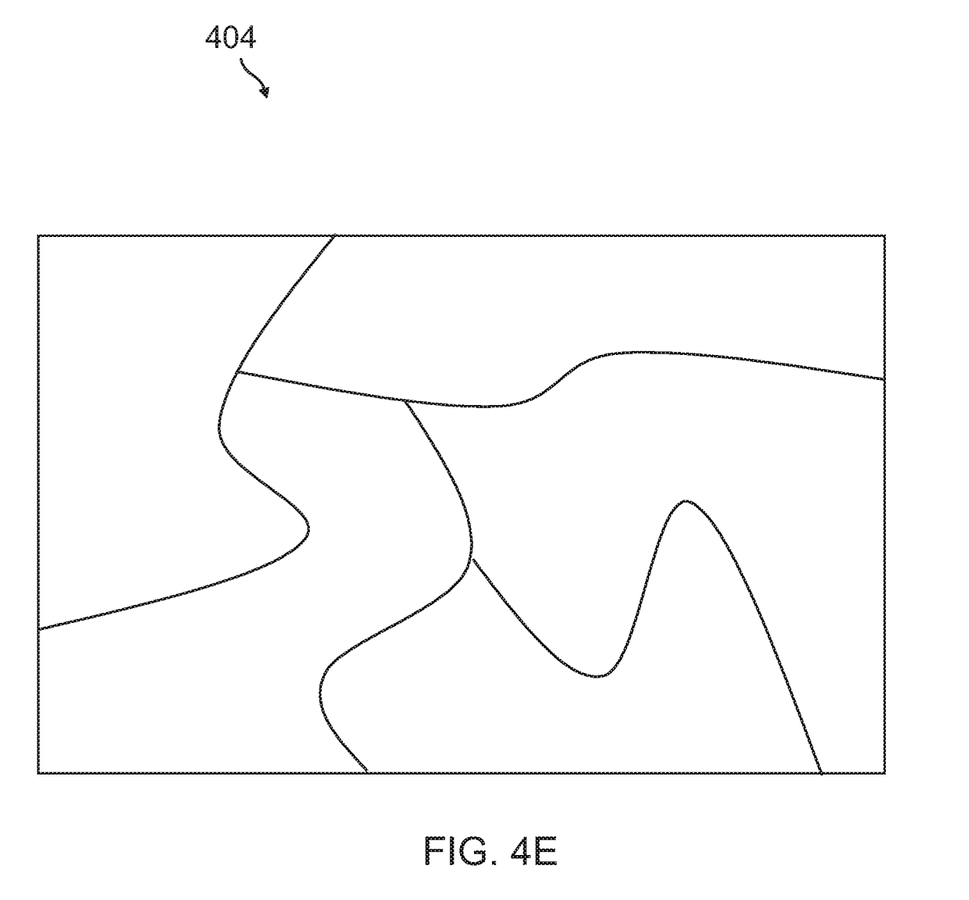

FIGS. 4A-4E illustrate various example arrangements of the multi-region base according to embodiments of the present disclosure. For example, in FIG. 4A, base 401 includes three rectangular regions that are mechanically coupled together adjacent each other. In FIG. 4B, base 402 includes nine square regions arranged in rows and columns. In FIGS. 4C-4D, the regions are substantially ring shaped regions (e.g., rectangular or circular ring shaped) that may be arranged concentrically to form a composite base 403. In FIG. 4E, the regions are formed of randomly shaped regions (e.g., non-uniform shape where each region is shaped differently) that be may arranged to form a composite base 404. As such, the regions may have a variety of uniform or non-uniform shapes and sizes as illustrated by way of example in FIGS. 4A-4E.

Figure 5:
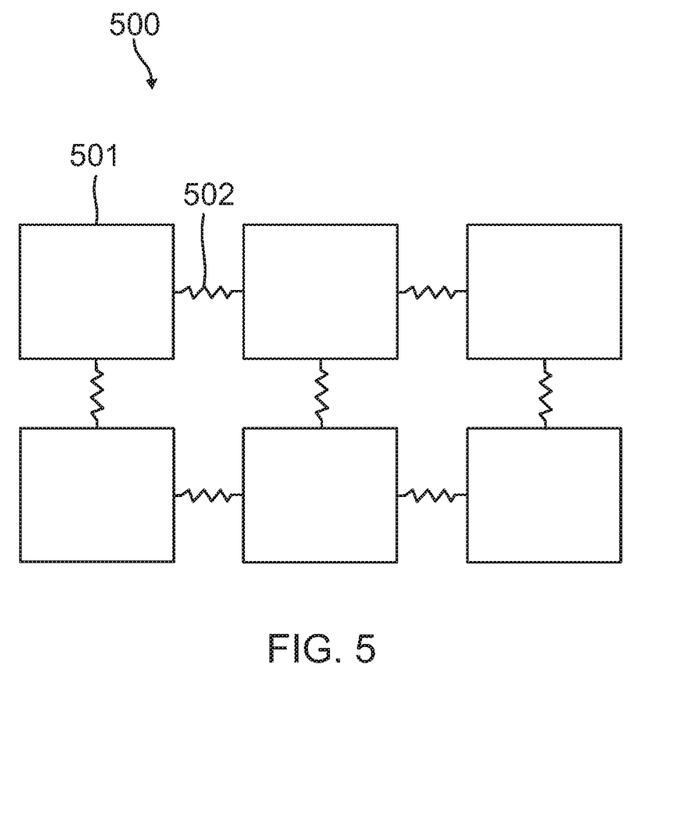
FIG. 5 is a block diagram of a multi-region base including resilient members according to an embodiment of the present disclosure.

FIG. 5 is a block diagram of a multi-region base 500 that includes resilient members 502 between the regions 501 according to an embodiment of the present disclosure. For example, when the regions 501 are modular regions that are configured to be mechanically coupled together to form a larger composite base 500, the regions 501 may thermally expand or contract at different rates because each modular region is independently temperature controlled. Accordingly, resilient members 502 such as, for example, a spring-loaded mechanical coupling or ductile insulating foam may be provided between each of the modular regions 501 to accommodate the differential thermal expansion by the regions.

Figure 6:
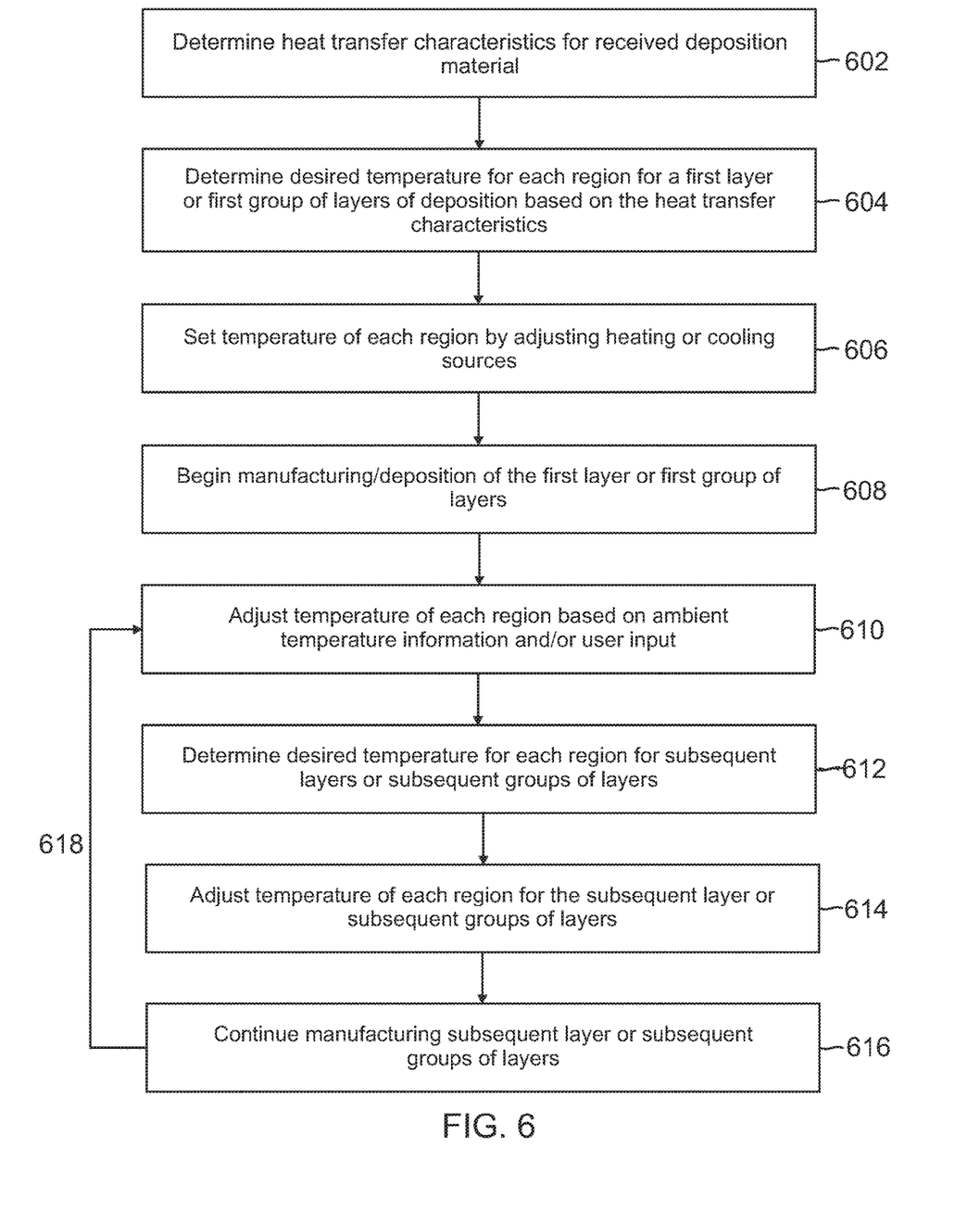
FIG. 6 is a flow chart of an additive manufacturing process using the multi-region temperature controlled base according to an embodiment of the present disclosure.

FIG. 6 is a flow chart of an additive manufacturing process using the multi-region temperature controlled base according to an embodiment of the present disclosure. According to an example additive manufacturing process for reducing residual stress and reducing distortion in an additively manufactured product, a desired heat transfer characteristic for the disposed deposition material is determined (602). For example, a computer analysis may be performed to determine heat transfer characteristics that will allow for the deposited material to cool down and solidify and/or cure in a more uniform manner, while reducing residual stress and distortion.

Next, a desired temperature for each region may be determined such then when all of the regions are operated together, the regions will provide the desired heat transfer characteristics for the deposited material (604). More specifically, a desired temperature is determined for each of the regions such that when all of the regions are operated together as a mechanically coupled thermally decoupled base, the first layer of the deposited material on the base will exhibit the determined heat transfer characteristics. Next, the temperature of each region is set to the determined temperature by adjusting the heating or cooling sources (606). When the temperature of each of the regions is set, the first layer (or first group of layers) may be deposited on the regions to begin manufacturing the product (608).

In some embodiments, the temperature of each region may be further adjusted based on, for example, measured ambient temperature at or near the regions or as provided by user input (610). In some embodiments, a temperature measuring device may be coupled to or embedded at the regions to provide temperature feedback to the computing device 102 to provide the further adjustments to the temperature.

Next, a desired temperature for each of the regions is determined for a second layer (or second group of layers) of the deposited material (612). For example, as multiple layers are deposited, the temperature required by each region may be different from the temperatures needed by the region when just the first layer is deposited. Thus, the desired temperature for each region is determined again to achieve or maintain the same heat transfer characteristics. Next, the temperature of each region adjusted to the determined temperatures (614). In some embodiments, the first layer may not necessarily be just one first layer, but instead, it may be a group of layers that are considered as the first group of layers. Similarly, the second layer may not necessarily be just the second layer but a group of layers that are deposited after the first group of layers.

Subsequent layers (or subsequent groups of layers) are next deposited over the second layer to continue with the additive manufacturing process (616). This process may be repeated as necessary for further layers until the final product is completed (618).

In this manner, an additive manufacturing operation may be performed by an additive manufacturing system by better controlling heat flow and thermal gradients of the deposited material by regionalizing the deposition base plate into regions and individually controlling the temperature of the regions. In doing so, residual stress and distortion may be reduced in the manufactured product.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A system comprising:
    a base configured to receive deposition material from an additive manufacturing apparatus, wherein the base comprises a plurality of regions configured to be individually temperature controlled to achieve desired heat transfer characteristics by at least a portion of the received deposition material;
    a temperature control system coupled with the plurality of regions and configured to adjust an associated temperature of each region of the plurality of regions to reduce residual stress and distortion in a product that is fabricated from the received deposition material during an additive manufacturing process;
    wherein the base further comprises resilient members disposed adjacent to and in between each of the regions;
    wherein each of the regions of the plurality of regions are individually movable modular regions configured to be mechanically coupled with each other by the resilient members therebetween to form a composite base and configured to be selectively arranged to achieve the desired heat transfer characteristics; and
    wherein the resilient members are configured to accommodate differential lateral expansion or contraction of the modular regions as the associated temperature of each of the modular regions is adjusted.

2. The system of claim 1, wherein the temperature control system comprises a plurality of heat transfer elements configured to transfer heat between the modular regions and the received deposition material.

3. The system of claim 2, wherein the modular regions are thermally decoupled with each other.

4. The system of claim 3, wherein each of the modular regions is configured to be individually movable in a direction along an X-axis, a Y-axis, or a Z-axis to form the composite base.

5. The system of claim 2, wherein each of the modular regions is associated with at least one of the plurality of heat transfer elements, and wherein each of the heat transfer elements is embedded in each of the modular regions.

6. The system of claim 2, wherein the temperature control system further comprises a heating source configured to adjust a rate of heat transfer from at least one of the heat transfer elements to at least one of the modular regions.

7. The system of claim 6,
    wherein at least one of the modular regions comprises a material having a thermal conductivity different from a thermal conductivity of a material of another one of the modular regions, and
    wherein the rate of heat transfer of each of the modular regions is based at least on the thermal conductivity of each respective modular region.

8. The system of claim 6, wherein the temperature control system further comprises:
    a temperature measuring device configured to determine a temperature of the received deposition material on the modular regions; and
    a temperature controller associated with the heating source and configured to determine adjustments to the heat transfer rate based at least on the determined temperature of the received deposition material to maintain a substantially uniform temperature along a desired portion of the received deposition material.

9. The system of claim 2, wherein the temperature control system further comprises a cooling source configured to adjust a rate of heat transfer from at least one of the modular regions to at least one of the heat transfer elements.

10. A method of operating a system,
    wherein the system comprises:
        a base configured to receive deposition material from an additive manufacturing apparatus, wherein the base comprises a plurality of regions configured to be individually temperature controlled to achieve desired heat transfer characteristics by at least a portion of the received deposition material,
        a temperature control system coupled with the plurality of regions and configured to adjust an associated temperature of each region of the plurality of regions to reduce residual stress and distortion in a product that is fabricated from the received deposition material during an additive manufacturing process,
        wherein the base further comprises resilient members disposed adjacent to and in between each of the regions, wherein each of the regions of the plurality of regions are individually movable modular regions configured to be mechanically coupled with each other by the resilient members therebetween to form a composite base and configured to be selectively arranged to achieve the desired heat transfer characteristics, and wherein the resilient members are configured to accommodate differential lateral expansion or contraction of the modular regions as the associated temperature of each of the modular regions is adjusted; and wherein the method comprises:

receiving the deposition material on the base, and adjusting, by the temperature control system coupled with the modular regions, the associated temperature of each modular region based on heat transfer characteristics.

11. The method of claim 10, wherein the temperature control system comprises a plurality of heat transfer elements, the method further comprising transferring heat between the modular regions and the received deposition material.

12. The method of claim 11, wherein the modular regions are thermally decoupled with each other.

13. The method of claim 12, wherein each of the modular regions is configured to be individually movable in a direction along an X-axis, a Y-axis, or a Z-axis to form the composite base.

14. The method of claim 11, wherein each of the modular regions is associated with at least one of the plurality of heat transfer elements, and wherein each of the heat transfer elements is embedded in each of the modular regions.

15. The method of claim 11, wherein the temperature control system further comprises a heating source, the method further comprising adjusting a rate of heat transfer from at least one of the heat transfer elements to at least one of the modular regions.

16. The method of claim 15, wherein at least one of the modular regions comprises a material having a thermal conductivity different from a thermal conductivity of a material of another one of the modular regions, and wherein the rate of heat transfer of each of the modular regions is based at least on the thermal conductivity of each respective modular region.

17. The method of claim 15, wherein the temperature control system further comprises:

a temperature measuring device configured to determine a temperature of the received deposition material on the modular regions; and a temperature controller associated with the heating source, the method further comprising determining adjustments to the heat transfer rate based at least on the determined temperature of the received deposition material to maintain a substantially uniform temperature along a desired portion of the received deposition material.

18. The method of claim 11, wherein the temperature control system further comprises a cooling source, the method further comprising adjusting a rate of heat transfer from at least one of the modular regions to at least one of the heat transfer elements.

19. The system of claim 2, wherein the heat transfer elements are electric resistive heating elements.

20. The method of claim 11, wherein the heat transfer elements are electric resistive heating elements.

* * * * *